Figure 1:
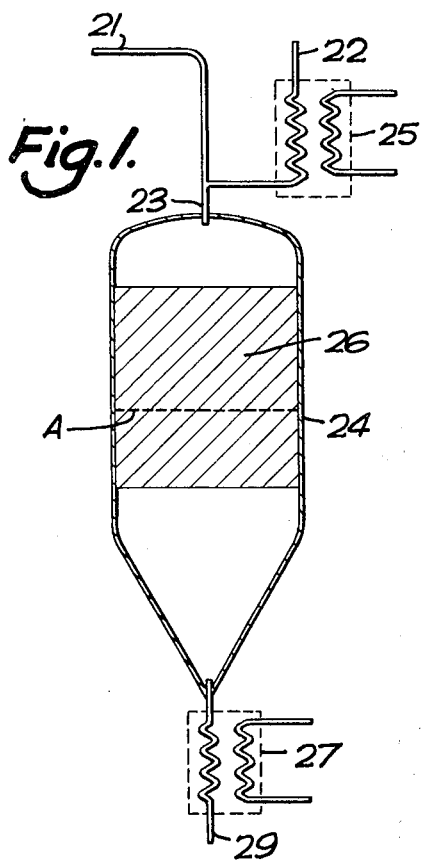

United States Patent [19]
Lacey et al.

[11] 3,915,670
[45] Oct. 28, 1975

[54] PRODUCTION OF GASES

[75] Inventors: John Aldwyn Lacey; Thomas Rowland Phillips; Robert Leslie Ensell, all of Solihull, England

[73] Assignee: British Gas Corporation, London, England

[22] Filed: Aug. 19, 1974

[21] Appl. No.: 498,729

Related U.S. Application Data

[63] Continuation of Ser. No. 286,827, Sept. 6, 1972, abandoned.

[30] Foreign Application Priority Data

Sept. 9, 1971 United Kingdom............ 42180/71

[52] U.S. Cl.............................. 48/197 R; 48/214
[51] Int. Cl.²................................ C01B 2/14
[58] Field of Search.......... 48/214, 197 R; 252/452, 252/459; 260/449 M; 252/373; 23/288 S

[56] References Cited
UNITED STATES PATENTS

| | | | |
|---|---|---|---|
| 2,662,005 | 12/1953 | Evans............................. | 48/197 R |
| 3,351,566 | 11/1967 | Taylor et al..................... | 252/459 |
| 3,395,004 | 7/1968 | Taylor et al..................... | 48/214 |
| 3,410,661 | 11/1968 | Taylor............................ | 48/214 |

FOREIGN PATENTS OR APPLICATIONS 792,914  4/1958  United Kingdom............ 48/197 R Primary Examiner—S. Leon Bashore
Assistant Examiner—Peter F. Kratz

[57] ABSTRACT

The invention is generally concerned with a process for the production of gaseous products by a chemical reaction, at least one reactant being liquid at normal temperature and pressure, which process comprises conducting the said reaction at a given pressure or a given temperature in the presence of a proportion of at least one of the reactants in the liquid phase, thereby controlling the temperature or the pressure of the reaction. The process is particularly useful for the catalytic gasification of light hydrocarbons with steam with water being present in the liquid phase, to produce a product gas which consists substantially of methane and carbon dioxide.

10 Claims, 2 Drawing Figures

U.S. Patent   Oct. 28, 1975   3,915,670

PRODUCTION OF GASES

This is a continuation of copending application Ser. No. 286,827, filed Sept. 6, 1972 and now abandoned.

The present invention is concerned with improvements in or relating to the production of gases. In a particular aspect the invention relates to the production in a single gasification stage of a gas consisting substantially wholly of methane and carbon dioxide, by the catalytic gasification of light petroleum oils (for instance, light petroleum distillate) with steam. Removal of carbon dioxide from the product gas by suitable known means provides a gas which is interchangeable with natural gas and which may be introduced into a natural gas transmission system. In a further particular aspect the present invention relates to the production in a single gasification stage of methane by the catalytic gasification of methanol.

Co-pending U.S. patent application Ser. No. 278,068, filed Aug. 4, 1972 and now abandoned and corresponding British patent application Ser. No. 37133/71, which applications are assigned to the assignee of the present application, describe a process for the production of gaseous products by a chemical reaction, at least one reactant being liquid at normal temperature and pressure, the said reaction being conducted at a given pressure or a given temperature in the presence of a proportion of at least one of the reactants in the liquid phase, thereby controlling the temperature or pressure of the reaction.

The vapour phase reactions which are carried out using the process of the invention described in said copending patent application Ser. No. 278,068 may be catalysed and such catalyst is maintained in a wet or moist condition. It has been found using the process described in said copending patent application in the steam-reforming of naphtha or light petroleum distillates, that even at the temperatures made possible by reaction at high pressures, exceptionally active catalysts have had to be used to obtain a satisfactory degree of conversion of the feedstock even at comparatively modest throughputs. This can be attributed, at least in part, to the fact that the catalyst is wet or moist, so that reactants and products have to diffuse through liquid films.

It has been found that it is not necessary or even always desirable for the whole of the catalyst used in the process described in said copending application to be maintained in a wet or moist condition in order for control of temperature and pressure in the reaction to be retained.

Accordingly the present invention provides a process for the production of gaseous products by a chemical reaction, which process comprises performing a catalytic gasification reaction at a given pressure or a given temperature, wherein a part of the reaction is effected in the presence of at least one of the reactants in liquid phase thereby controlling the temperature or the pressure of the reaction and a part of the reaction is effected with all the reactants in gaseous phase, the catalyst for such gasaeous phase reaction being in a dry condition.

While the catalytic gasification reactions are initiated and largely performed with one of the reactants in liquid phase, i.e. with the catalyst moistened, they are completed in the vapour phase wholly as catalytic gasphase reactions, i.e. with the catalyst in dry condition, and sufficient control over the temperature or the pressure of the reaction is thus achieved. The preferred way of obtaining this desired result is to allow the temperature of operation to rise, by a comparatively small amount, so that saturation conditions with respect to any reactant cease to be obtained at a certain appropriate distance along the catalytic bed. This is done by suitable manipulation of reactant proportions, or of the proportion of any reactant that is in the liquid phase, or of the pressure, or of preheat temperatures either singly or in appropriate combination. It will be appreciated that if the supply of liquid phase is excessive or if insufficient heat is supplied either as preheat or by other means, a dry portion of the catalyst bed will not be established.

Any convenient method of providing for the apparatus to enclose a dry portion of catalyst may be used. A dry portion may be immediately adjacent to the moist portion, as indicated above. Alternatively there may be used in conjunction with a catalyst bed operated wholly in a wet condition a further bed of catalyst in a separate vessel. The further bed of catalyst need not be of the same character as the catalyst which is kept in the wet condition. If a separate bed of catalyst is used, there may be provision for condensation of some of a reactant between the dry and wet catalyst portions. Heat may be employed separately to maintain a bed or part of a bed in the dry condition.

Broadly the present invention provides a catalytic process for producing a gas consisting substantially wholly of methane and carbone dioxide by reacting a feedstock, which is either methanol or a light petroleum oil with $H_2O$ in the presence of a catalyst therefore. The process comprises forming an admixture of the feedstock and $H_2O$ and thereafter contacting the admixture with a first batch of catalyst in a first reaction zone while maintaining the temperature and pressure in said first reaction zone at respective levels such that liquid water is present in said first zone and while keeping the first batch of catalyst in contact with such liquid water to thereby convert the admixture into a wet zone effluent stream. Thereafter, the wet zone effluent stream is contacted with a second batch of catalyst in a second reaction zone while the temperature and pressure in the second reaction zone are maintained at respective levels such that all of the reactants in the second zone are present in the gas phase whereby the second batch of catalyst is kept in a dry condition. The temperature in the first zone and the temperature in the second zone are each maintained within the range of from 250° to 500°C during the contacting operations.

In one preferred aspect of the invention, the feedstock consists essentially of light hydrocarbons which are a predominantly aliphatic petroleum distillate having a final boiling point of less than 170°C. In another preferred aspect of the invention, the temperature in the first reaction zone is maintained within the range of from 250° to 350°C.

The catalyst employed may be a catalytic metal selected from the group consisting of ruthenium, nickel, cobalt and mixtures thereof which is characterized by having been precipitated from solution. In the more preferred forms of the invention the catalyst employed in the process may consist essentially of a co-precipitated nickel and silica material in which the nickel is present in an amount of from 50 to 85% by weight thereof and the silica is present in an amount of from 50 to 15% by weight thereof or a co-precipitated ruthenium and alumina material in which the ruthenium is present in an amount of from 20 to 50% by weight thereof and the alumina is present in an amount of from 80 to 50% by weight thereof.

The invention will now be more particularly described with reference to the gasification of light hydrocarbons with steam and with reference to the accompanying drawing in which:

FIG. 1 shows a vertical reaction vessel 24 packed with a catalyst bed 26 with provision to supply water and steam at 21 and distillate at 22, preheated as necessary in heat exchanger 25, via mixing point 23 to the top of the bed. The quantities of the various reactants and the temperature of the catalyst bed are so controlled that at the distance along the catalyst indicated by A in the diagram, saturated conditions cease to exist and the part of the catalyst bed below Line A is thus in dry condition. Product gases pass out via heat exchanger 27 where they are cooled and issue at 29.

Figure 2:
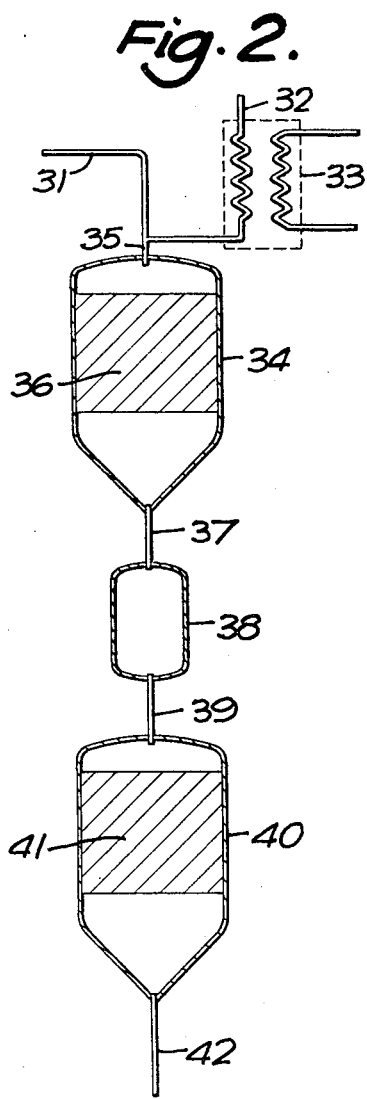

FIG. 2 shows two vertical reaction vessels 34 and 40 in series, which are packed with catalyst beds 36 and 41, respectively. Steam via line 31 and distillate via line 32, preheated as necessary in heat exchanger 33 are passed via mixing point 35 to the top of the catalyst bed 36. The gaseous reactants and products pass out via 37 and condensed water is collected in catchpot 38. The gases enter the second reaction vessel at 39. The catalyst bed 41 is maintained in dry condition, and the final product gases issue at 42.

In apparatus of the type described with reference to FIG. 1 of the drawings, but with the inlet and outlet interchanged so that the direction of flow of the reactants is upwards, it is necessary to prevent undecomposed reactant condensing in such a way as to cause it to run back onto the catalyst if the vessel depicted in this Figure is to contain a dry outlet end at the top of the catalyst column.

Though the temperatures at which the dry end of the catalyst bed needs to operate in order to complete the reactions and so to achieve the improved result are, as indicated above, higher than the temperatures generally used when all the catalyst is in the wet condition, they are still very low by comparison with what would normally be expected to be necessary from a knowledge of catalyst activities.

The present invention is further illustrated by the following Examples.

EXAMPLE I

I. Catalyst Preparation 1114 grams nickel nitrate hexahydrate were dissolved in 2 liters of distilled water and to the cold solution 132.7 mils of waterglass (laboratory quality sodium silicate 560 grams $SiO_2$ per liter) was added with stirring. Some of the nickel was then precipitated. The mixture was heated to 60°–70°C and maintained thus while sufficient initially cold potassium carbonate solution (60 $K_2CO_3$: 100 $H_2O$ by weight) to precipitate the rest of the nickel was added slowly, with stirring, care being taken to control frothing due to carbon dioxide liberation. The precipitate was then filtered and washed with 1500 ml. batches of distilled water by reslurrying at 60°–70°C until the washings were neutral. (Sodium carbonate solution (40 $Na_2CO_3$: 100 $H_2O$ by weight) may be used if desired as an alternative precipitant).

The precipitate was dried overnight at 120°C and then calcined for 4 hours at 450°C. The dry material was crushed to below 25 B.S.S. and with the addition of 2 per cent of graphite pelleted to ⅛ in. cylinders. The nominal composition of the catalyst (calculated assuming reduction to have taken place) was: Ni, 75; $SiO_2$, 25, per cent by weight. A batch was analysed, and on the same basis consisted of: Ni, 75.5; $SiO_2$, 24.1; alkali, 0.4, percent by weight.

II Apparatus, Method of Operation and Results 252 g. of the nickel-silica catalyst in the form of ⅛ in. cylinders were packed into a 0.75 in. diameter vertical stainless steel reactor tube which was 44 in. long to give a bed 36 in. long. The catalyst rested on an inert packing of silica chips filling the lower 4 in. of the tube, thus leaving 4 in. of empty space above the bed. The apparatus was operated with downward flow of reactants.

Sulphur free naphtha (LDF 115*) was gasified continuously for 525 hours over the above catalyst under the following operating conditions:

| | |
|---|---|
| Pressure | 2400 psig |
| Steam/naphtha ratio | 2/1 by weight |
| Temperatures: | |
| Inlet | 320° – 325°C |
| Maximum | 385° – 390°C |
| Outlet | 350° – 355°C |
| Throughput | 39.7 lb naphtha per hour per sq.ft. of catalyst column cross-section. |

Product Gas Composition (per cent by volume):

| | dry | dry, after $CO_2$ removal to 1 per cent |
|---|---|---|
| Carbon Dixoide | 21 | 1 |
| Methane | 78 | 97.8 |
| Hydrogen | 1 | 1.2 |

These conditions were well maintained throughout the experiment, during which substantially 100 percent gasification of the naphtha was achieved; thus, the performance of the catalyst was stable.

It will be noted that the fall in temperature along the catalyst bed, from a maximum, towards the outlet, contrasts with what would be expected in a fully adiabatic apparatus at lower pressures, e.g. 25 atmospheres. In the laboratory tube, which is not perfectly insulated, some small fall is to be expected but there is reason to think that what is observed is not all to be attributed to heat loss. The further mechanism of internal cooling is not yet fully understood.

* This designation refers to the result of applying method No. I.P. 123/64, Institute of Petroleum, "Standard Methods of Test for the Distillation of Petroleum Products", to samples of the light petroleum distillates. The method is a standard side-arm distillation and the temperature of the vapour is measured immediately before its enters the side-arm to reach the condenser. When a light petroleum distillate designated L.D.F. T°C, is submitted to this test, not less than 95% by volume of the initial distillate shall have been condensed and collected in the receiver when the temperature at the inlet to the side-arm has reached T°C. T°C is generally a few degrees C lower than the final boiling-point as observed in the same test.

EXAMPLE 2

A mixture of methanol, water and steam was supplied to apparatus resembling that described in Example 1, operating downward flow, but accommodating a ½in. diameter column of catalyst, 24 in. long, having provision for a part of the catalyst bed to be operated dry, under the following conditions:

| Pressure | 2400 psig |
| --- | --- |
| Water/methanol ratio | 1:2.37 by weight |
| Temperatures: | |
| Inlet | 300°C |
| Maximum | 500°C |
| Outlet | 360°C |
| Throughput | 570 lb of water-methanol mixture per hour per sq.ft. of catalyst cross-section. |

Product Gas Compositions (per cent by volume):

| | dry | dry, after $CO_2$ removal to 1 per cent |
| --- | --- | --- |
| Carbon dioxide | 22.0 | 1.0 |
| Methane | 76.5 | 97.1 |
| Hydrogen | 1.5 | 1.9 |

The catalyst used was either a standard co-precipitated alkali-containing nickel-alumina catalyst as described in our British patent specification No. 969637, preferably a catalyst containing a nominal 75 percent of nickel and 0.6 percent by weight of potassium, or a 10 percent ruthenium on alumina catalyst as described in our abovementioned copending patent application.

In the above experiment, which lasted for 50 hours without sign of deterioration of performance, the methanol was substantially completely decomposed.

It will again be noted that there is a substantial temperature drop in the catalyst bed, beyond the point at which the maximum is reached.

In the gasification both of naphtha and methanol, as described above, gas of a composition nearly approaching that of pure methane is achieved by drying the product gas and removing carbon dioxide therefrom.

The following additional Examples further illustrate the present invention.

EXAMPLE 3

I. Preparation of Catalyst 663 grams of aluminium nitrate and 26.8 grams of ruthenium trichloride were dissolved in 1500 mls of distilled water and heated to 60°C. A solution containing 20 percent by weight of ammonium bicarbonate was added carefully with stirring until a pH of 8 was reached. The resulting precipitate was filtered and washed with 1500 ml batches of distilled water until completely free from chloride ions as tested with silver nitrate solution. The precipitate was dried overnight at 120°C. This gave a catalyst nominally comprising 10 percent by weight of ruthenium on alumina. The resulting material was crushed to below 25 B.S.S. and with the addition of 2 percent graphite pelletted to ⅛ inch equant cylinders.

II. Apparatus, Method of Operation And Results 295 grams of the ruthenium on alumina catalyst in the form of ⅛ inch cylinders were packed into a reactor of the same dimensions as described in Example 1.

Sulphur-free naphtha (L.D.F. 115) was gasified continously for 250 hours over the above catalyst under the following operating conditions.

| Pressure | 2400 p.s.i.g. |
| --- | --- |
| Steam/naptha ratio | 2:1 by weight |
| Temperatures: | |
| Inlet | 320 – 326°C |
| Maximum | 366 – 371°C |
| Outlet | 338 – 350°C |
| Throughput | 47 lb. naphtha per hour per sq.ft. of catalyst column cross-section. |

Product Gas Composition (per cent by volume)

| | dry | dry, after $CO_2$ removal to 1 per cent |
| --- | --- | --- |
| Carbon dioxide | 21.6 | 1.0 |
| Methane | 77.4 | 97.5 |
| Hydrogen | 1.0 | 1.2 |

Substantially 100 percent gasification occurred throughout the experiment.

EXAMPLE 4

I. Preparation of Catalyst

Method as for Example 3 to give a nominally 50 percent by weight ruthenium on alumina catalyst.

II. Apparatus, Method of Operation and Results

The ruthenium on alumina catalyst was packed into a reactor similar to that used in Example 2. Sulphur-free naphtha (LDF 115) was gasified continuously under the following conditions for 6 hours, no attempt being made to study the duration of the activity of the catalyst.

| Pressure | 2400 psig |
| --- | --- |
| Steam/naptha ratio | 2:1 by weight |
| Temperatures: | |
| Inlet | 319 – 326°C |
| Maximum | 350 – 358°C |
| Outlet | 333 – 342°C |
| Throughput | 105 lb. per hr. per sq.ft. of catalyst column cross-section. |

Product Gas Composition (per cent by volume)

| | dry | dry, after $CO_2$ removal to 1 per cent |
| --- | --- | --- |
| Carbon dioxide | 22.30 | 1.0 |
| Methane | 76.30 | 96.9 |
| Hydrogen | 1.40 | 1.8 |

Substantially 100 percent gasification occurred throughout the experiment.

EXAMPLE 5

I. Preparation of Catalyst 1114 grams of nickel nitrate and 138 grams of aluminium nitrate were dissolved in 6 liters of distilled water. A solution of sodium silicate was prepared by dissolving 99.5 mls of water glass (560 grams $SiO_2$ per liter) in 4 liters of distilled water and 628 grams of anhydrous sodium carbonate was then dissolved in the silicate solution. The alkaline silicate solution was gradually added to the solution of nitrates whilst vigorously stirring. The precipitation was carried out at room temperature and the pH of the resulting hydrogel solution was 8 ± 0.5. The precipitate was filtered and the resulting material broken up and dried slowly by heating in an oven at 110°C. The dried catalyst was treated with successive portions of a 5 percent (by weight) solution of ammonium nitrate followed by hot distilled water to remove the sodium. After drying, the catalyst was heated to 350°C in air for 4 hours. This material, on addition of 2 per cent graphite, was pelletted to ⅛ in. equant cylinders. The nominal composition of the catalyst, assumed reduced, was: Ni, 75.0; $Al_2O_3$, 6.25; $SiO_2$, 18.75, percent by weight.

II. Apparatus, Method of Operation and Results 72 grams of the nickel-silica-alumina catalyst were packed in a reactor of the same dimensions as given in Example 2.

Sulphur-free naphtha (LDF 115) was gasified continuously for 5 hours under the following conditions:

| | |
|---|---|
| Pressure | 2400 psig |
| Steam/naptha ratio | 2:1 by weight |
| Temperatures: | |
| Inlet | 326 – 329°C |
| Maximum | 364 – 370°C |
| Outlet | 326 – 336°C |
| Throughput | 105 lb. per hr. sq.ft. of catalyst column cross-section. |

Product Gas Composition (per cent by volume)

| | dry | dry, after $CO_2$ removal to 1 per cent |
|---|---|---|
| Carbon dioxide | 19.7 | 1.0 |
| Methane | 77.8 | 95.7 |
| Hydrogen | 2.5 | 3.2 |

In all the experiments, the catalyst, having been charged to the apparatus, was reduced in hydrogen before use.

The invention also includes within its scope gaseous products, for example a gas consisting substantially wholly of methane and carbon dioxide whenever prepared by the process of the invention.

The process of the invention may be used also in similar manner to produce methane from propane or butane, which may be in liquid form, or from methanol.

We claim:

1. A catalytic process for producing a gas consisting substantially wholly of methane and carbon dioxide by reacting methanol with $H_2O$ in the presence of a catalyst therefor, said process comprising:
    forming an admixture of said methanol and $H_2O$;
    contacting said admixture with a first batch of said catalyst in a first reaction zone while maintaining the temperature and pressure in said first reaction zone at respective levels such that liquid water is present in said first zone and while keeping said first batch of catalyst in contact with said liquid water to thereby convert the admixture into a wet zone effluent stream;
    contacting said wet zone effluent stream with a second batch of said catalyst in a second reaction zone while maintaining the temperature and pressure in said second reaction zone at respective levels such that all of the reactants in said second zone are present in the gaseous phase whereby said second batch of catalyst is kept in a dry condition,
    the temperature in said first zone and the temperature in said second zone each being maintained within the range of from 250° to 500°C during said contacting operations.

2. A process as set forth in claim 1 wherein said catalyst comprises a catalytic metal selected from the group consisting of ruthenium, nickel, cobalt and mixtures thereof, said catalytic metal being characterized by having been precipitated from solution.

3. A process as claimed in claim 2 wherein said catalyst consists essentially of a co-precipitated nickel and silica material in which the nickel is present in an amount of from 50 to 85% by weight thereof and the silica is present in an amount of from 50 to 15% by weight thereof.

4. A process as claimed in claim 2 wherein the catalyst consists essentially of a co-precipitated ruthenium and alumina material in which the ruthenium is present in an amount of from 20 to 50% by weight thereof and the alumina is present in an amount of from 80 to 50% by weight thereof.

5. A catalytic process for producing a gas consisting substantially wholly of methane and carbon dioxide from a feedstock comprising a light petroleum oil capable of undergoing such gasification when reacted with $H_2O$ in the presence of a catalyst therefore, said process comprising:
    forming an admixture of said feedstock and $H_2O$;
    contacting said admixture with a first batch of said catalyst in a first reaction zone while maintaining the temperature and pressure in said first reaction zone at respective levels such that liquid water is present in said first zone and while keeping said first batch of catalyst in contact with said liquid water to thereby convert the admixture into a wet zone effluent stream;
    contacting said wet zone effluent stream with a second batch of said catalyst in a second reaction zone while maintaining the temperature and pressure in said second reaction zone at respective levels such that all of the reactants in said second zone are present in the gaseous phase whereby said second batch of catalyst is kept in a dry condition,
    the temperature in said first zone and the temperature in said second zone each being maintained within the range of from 250° to 500°C during said contacting operation.

6. A process as set forth in claim 5 wherein said catalyst comprises a catalytic metal selected from the group consisting of ruthenium, nickel, cobalt and mixtures thereof, said catalytic metal being characterized by having been precipitated from solution.

7. A process as set forth in claim 6 wherein said catalyst consists essentially of co-precipitated nickel and silica material in which the nickel is present in an amount of from 50 to 85% by weight thereof and the silica is present in an amount of from 50 to 15% by weight thereof.

8. A process as claimed in claim 6 wherein the catalyst consists essentially of a co-precipitated ruthenium and alumina material in which the ruthenium is 9. A process as set forth in claim 5 wherein said light petroleum oil is a predominantly aliphatic petroleum distillate having a final boiling point of less than 170°C.

10. A process as set forth in claim 5 wherein the temperature in said first reaction zone is maintained within the range of from 250° to 350°C.

* * * * *